Oct. 13, 1942.  J. A. MAURER, JR  2,299,024
OPTICAL SYSTEM
Filed July 2, 1940   5 Sheets-Sheet 1

INVENTOR
JOHN A. MAURER, JR.
BY
AGENT

Oct. 13, 1942.    J. A. MAURER, JR    2,299,024
OPTICAL SYSTEM
Filed July 2, 1940    5 Sheets-Sheet 2

INVENTOR
JOHN A. MAURER, JR.
BY *Otto J. Nathansohn*
AGENT

Oct. 13, 1942.     J. A. MAURER, JR     2,299,024
OPTICAL SYSTEM
Filed July 2, 1940     5 Sheets-Sheet 4

INVENTOR
JOHN A. MAURER, JR.
BY *Otto J. Nathansohn*
AGENT

Oct. 13, 1942.   J. A. MAURER, JR   2,299,024
OPTICAL SYSTEM
Filed July 2, 1940   5 Sheets-Sheet 5

INVENTOR
JOHN A. MAURER, JR.
BY Otto J. Nathansohn
AGENT

Patented Oct. 13, 1942

2,299,024

UNITED STATES PATENT OFFICE 2,299,024

OPTICAL SYSTEM

John A. Maurer, Jr., New York, N. Y., assignor, by mesne assignments, to J. A. Maurer, Inc., a corporation of New York Application July 2, 1940, Serial No. 343,617

35 Claims. (Cl. 179—100.3)

This invention relates to optical systems for the photographic recording of electrical impulses on a moving film such as are used in sound recording, picture transmission, and the like. More particularly, it relates to optical systems of this class which produce impulse records of constant width but varying intensity. Such records are known as variable density records.

The optical systems for variable density recording used in present-day practice commonly employ either a glow lamp, or a string oscillograph or light valve. These devices for translating electrical impulses into vibrations of a beam of light have certain inherent drawbacks which are generally known and hence need not be stated here in detail. It has therefore been proposed to employ, for variable density recording, optical systems having a mirror oscillograph or similar translating device, and it is an object of the invention to provide an improved optical system of this type.

Another object of the invention is the provision of an optical system of this type which is particularly satisfactory as regards efficiency of illumination, convenience of adjustment, and ease of manufacture.

Another object of the invention is the provision of an optical system of this type by means of which a linear relation between the electrical impulses to be recorded and the transparency of the record used for their reproduction may easily be effected.

Another object of the invention is the provision of an optical system of this type which may be built with small physical size and at comparatively little cost.

Another object of the invention is the provision, in such an optical system, of means by which a re-imagery of the recording light source on the film may be positively excluded.

Another object of the invention is the provision of an optical system of this type which may permit its visible adjustment, and also visible monitoring of the recording of the electrical impulses, in a particularly convenient and accurate manner.

Another object of the invention is the provision, in such an optical system of means for producing a light spot of graded illumination which are easy and inexpensive to manufacture, and which are generally more satisfactory than similar means known heretofore.

More particularly, however, the object of the invention is to improve the optical systems for variable density recording which are disclosed in my co-pending applications, Ser. Nos. 343,615 and 343,616, filed on the same day and assigned to the same assignee as the present application. Those optical systems employ, for the formation of a final line image, means which include a mechanical slit. With the use of a mechanical slit, however, difficulties are encountered such as the collection of dust particles on it and the impossibility of reducing its width beyond a certain limit for mechanical reasons. It is therefore an object of the invention to provide in the optical systems hereinabove referred to means which perform the function of a mechanical slit without having its disadvantages.

Still other objects and advantages of the invention include those which are hereinafter stated or apparent, or which are incidental to the invention.

The objects of the invention are substantially achieved by providing in an optical system of the type described means for forming at some point close to said means a line image of the oscillograph mirror. This line image extends in a direction at right angles to the direction in which the film moves at the recording point, that is, the point at which the optical axis of the system strikes the film, and the means forming the line image act only in a plane which is at right angles to the line image and extends through the recording point. The optical system furthermore has means for forming an image of said line image, which means act only in the same plane as the means forming the line image. The optical system finally has means for imaging the oscillograph mirror approximately at the image of the line image, which means act in a plane at right angles to the first mentioned plane and to the direction in which the film moves at the recording point.

Throughout the present specification, the direction in which the film moves at the recording point, and the directions parallel to it, will be called vertical, and the direction in which the line image of the oscillograph mirror extends, and the directions parallel to it, will be called horizontal, the horizontal directions being at right angles to the vertical directions. Moreover, the plane in which the means forming the line image act will be called the vertical plane, and the plane at right angles to the vertical plane and to the direction in which the film moves at the recording point will be called the horizontal plane, the horizontal plane containing the line image of the oscillograph mirror.

It will thus be seen that in the present specification the terms "vertical" and "horizontal" will not be used in any absolute sense but merely as indicating relative position or direction, and that choice between these terms has been determined merely by convenience in description and illustration.

The threefold imagery of the oscillograph mirror described hereinabove results in the formation of a final line image which is defined by the actions of the three means employed for the imagery of the mirror. The final line image thus is formed merely by optical means, and its dimensions hence can be easily controlled by suitably choosing such means. Its vertical extension or width in particular can be reduced considerably, a very fine final line image being desirable in the photographic recording of electrical impulses.

The optical system according to the present invention also has means for varying the amount of light present in the final line image. These means include means forming a uniformly illuminated light spot and means acting in the vertical plane for forming an image of this light spot, which image is movable by the vibration of the oscillograph mirror.

The invention will be better understood when the following description is considered with the accompanying drawings of certain presently preferred embodiments thereof, and its scope will be pointed out in the appended claims.

In the drawings.

Throughout the drawings identical parts are designated by identical reference characters.

Referring first to Figs. 1 to 4, there is shown a recording light source such as the filament 10 of an incandescent lamp 11. Light from filament 10 is directed by a suitable condenser lens 12, preferably of wide aperture, upon the mirror 13 of an oscillograph galvanometer (not shown) or similar device translating electrical impulses into mechanical vibrations. The axis 14—14 about which mirror 13 is mounted to vibrate extends horizontally.

A cylindrical lens 15 of short focal length acts on the light flux proceedings through the optical system after it has been reflected from mirror 13. Cylindrical lens 15 has its cylinder axis horizontal and hence does not act in the horizontal plane. But by its action in the vertical plane cylindrical lens 15 forms at some position A close to it a line image of mirror 13 (see Fig. 2).

A second cylindrical lens 16 is placed between cylindrical lens 15 and the film 17. Cylindrical lens 16 also has its cylinder axis horizontal and therefore also acts in the vertical plane only. Its function is to image on film 17 at the recording point 18 the line image of mirror 13 which is formed at position A by cylindrical lens 15 (see Fig. 2). This double imagery of mirror 13 by the two cylindrical lenses 15 and 16, which both act in the vertical plane only, results in the formation, at the recording point 18, of a final line image whose vertical extension or width can be reduced considerably without loss of illumination by selecting cylindrical lenses of suitable optical constants.

Figures 1, 2:
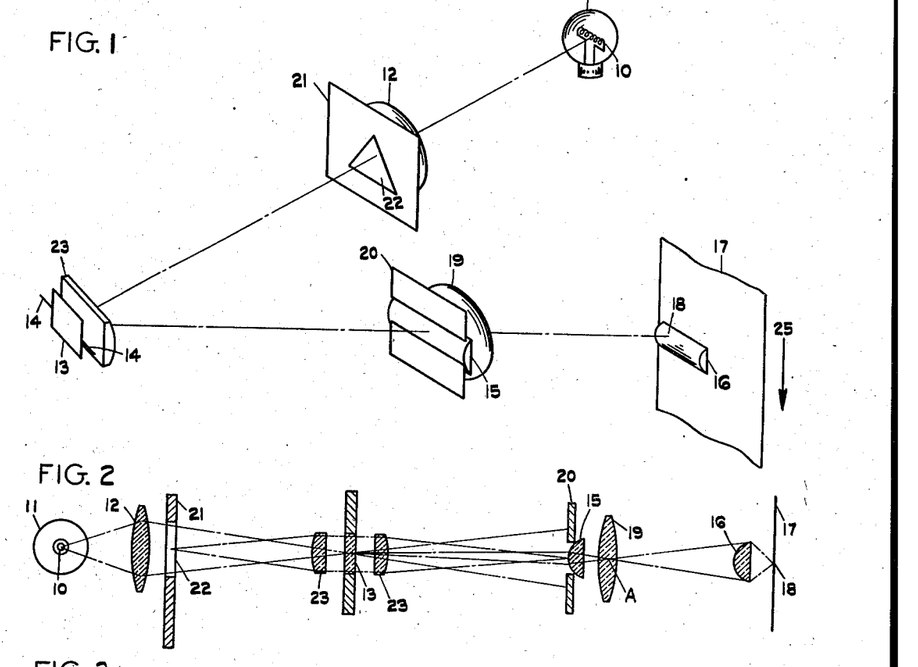
Fig. 1 is a diagrammatic perspective view of one embodiment of the invention.
Fig. 2 is a diagrammatic longitudinal section in the vertical plane of the optical system shown in Fig. 1, the optical axis being represented as a straight line and an oscillograph mirror being represented as an aperture.
Figure 3:
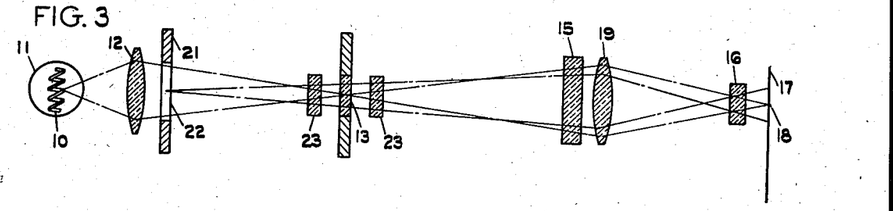
Fig. 3 is a corresponding section in the horizontal plane.
Figure 4:
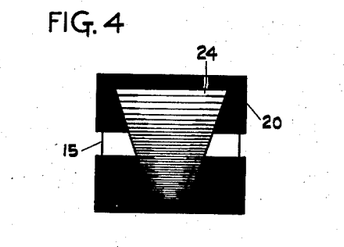
Fig. 4 is an elevation of one element shown in Fig. 1 showing the light spot of graded illumination produced thereon, Figs. 5 to 7 correspond to Figs. 1 to 3 but for the substitution of a cylindrical lens for a spherical lens in front of the oscillograph mirror.

A spherical lens 19 is placed between cylindrical lenses 15 and 16 in such a manner that position A falls within lens 19. The focal length of spherical lens 19 is so chosen that it forms an image of mirror 13 on, or in the neighborhood of, film 17, that is, approximately at the recording point 18 and the image formed there by cylindrical lens 16. To throw the image of mirror 13 slightly out of focus with respect to film 17 has the advantage that the ordinarily coiled structure of lamp filament 11, which is reproduced on mirror 13, is not re-imaged on film 17, where it would cause striations of a generally undesirable character.

As lens 19 is spherical it acts in both the vertical and horizontal planes. By its action in the horizontal plane, it determines the horizontal extension or length of the final line image formed at the recording point 18, which length depends upon the horizontal extension or length of the image of mirror 13 as produced by spherical lens 19 (see Fig. 3).

The action of spherical lens 19 in the vertical plane has very little effect on the formation of the final line image because the power of spherical lens 19 in this plane is negligibly small in comparison with the power of cylindrical lenses 15 and 16 in the same plane. The action of spherical lens 19 in the vertical plane may therefore be barred, and it is actually barred in the optical system under discussion by a mask 20 placed in front of cylindrical lens 15 (see Fig. 2). Mask 20 is so placed with respect to cylindrical lens 15 that it intercepts the light flux not acted upon by that lens in order to avoid the formation, by spherical lens 19, of undesirable secondary and tertiary images of mirror 13 in the vicinity of the recording point 18 (see Fig. 2).

It will thus be seen that by the cooperation of cylindrical lenses 15 and 16 and spherical lens 19 there is formed at the recording point 18 a final line image whose width and length are defined by the respective actions of these lenses. The amount of light present in the final line image, however, is varied in accordance with the electrical impulses to be recorded as follows:

A screen 21 is placed between lamp 11 and mirror 13 and adjacent to condenser lens 12. Screen 21 has an opening 22 which is an isosceles triangle with its base extending horizontally, and which is uniformly illuminated by lamp filament 10. Thus, there is formed at screen 21 a uniformly illuminated light spot whose horizontal extension gradually varies in a vertical direction.

A cylindrical lens 23 with its cylinder axis horizontal is placed in front of mirror 13. Cylindrical lens 23 forms an image of opening 22 on, or in the neighborhood of, mask 20, that is, approximately at cylindrical lens 15 (see Fig. 2). As cylindrical lens 23 acts in the vertical plane only, the image of opening 22 is a light spot 24 (see Fig. 4) whose illumination gradually varies in a vertical direction, while, on account of the aperture effect of mirror 13, its horizontal extension also varies to some extent in a vertical direction and the light flux contained therein is not evenly distributed horizontally. But the individual horizontal levels of light of which light spot 24 may be considered to consist gradually vary in light flux in a manner which is directly and linearly proportional to the manner in which the horizontal extension of opening 22 gradually varies in length. For a fuller explanation of the imagery of a uniformly illuminated light spot whose horizontal extension gradually varies in a vertical direction by a cylindrical lens acting in the vertical plane only, and also of the aperture effect of a small mirror upon such imagery, reference is made to my application Ser. No. 343,616.

From which horizontal level of light spot 24 the light flux emanates which is acted upon by cylindrical lens 15 depends upon the degree of deflection of mirror 13, as light spot 24 is vertically movable by the vibration of mirror 13 about its horizontal axis 14—14. When therefore the electrical impulses to be recorded are applied in known manner to the oscillograph galvanometer on which mirror 13 is mounted, the light flux contained in the line image of mirror 13 as formed by cylindrical lens 15 varies in accordance with the electrical impulses to be recorded and in a manner which is directly and linearly proportional to the manner in which the horizontal extension of opening 22 gradually varies in a vertical direction.

These variations of the light flux contained in the line image of mirror 13 formed at position A become manifest as variations of its length as well as of its illumination, because the uneven distribution as regards length and intensity of the light flux contained in light spot 24 is not altered at position A since position A is close to light spot 24 and cylindrical lens 15 does not act in the horizontal plane. But in the final line image formed at the recording point 18, they become manifest only as variations of its illumination, for the length of the final line image is determined by the length of the image of mirror 13 formed by the action of spherical lens 19 in the horizontal plane, and this image length remains constant no matter into what position mirror 13 is deflected, provided, of course, that at least some part of the light flux contained in light spot 24 enters cylindrical lenses 15 and 16. The length of the image of mirror 13 as formed by spherical lens 19 should therefore be at least equal to the desired horizontal extension or width of the impulse record on film 17.

The action of spherical lens 19 in the horizontal plane furthermore brings it about that whatever light flux is contained in the line image formed at position A is evenly distributed over the length of the final line image, although it was not evenly distributed horizontally in the line image formed at position A.

Thus a final line image whose length is constant and whose illumination varies in accordance with the electrical impulses to be recorded, is formed at the recording point 18, and a variable density record is produced on film 17 when it moves past the recording point 18 in a substantially vertical direction, as indicated by the arrow 25.

In Figs. 5 to 7 and 8 to 10, there are shown by way of further example two other optical systems embodying the present invention. As in the case shown in Figs. 1 to 4, the width of the final line image formed at the recording point 18 is determined also in these two cases by the image of mirror 13 as formed by the actions of cylindrical lenses 15 and 16 in the vertical plane only, and its length by the image of mirror 13 as formed by the action of spherical lens 19 in the horizontal plane. But the two cases differ from each other and from the case shown in Figs. 1 to 4 in the manner in which the amount of light present in the final line image is varied in accordance with the electrical impulses to be recorded.

Figure 5:
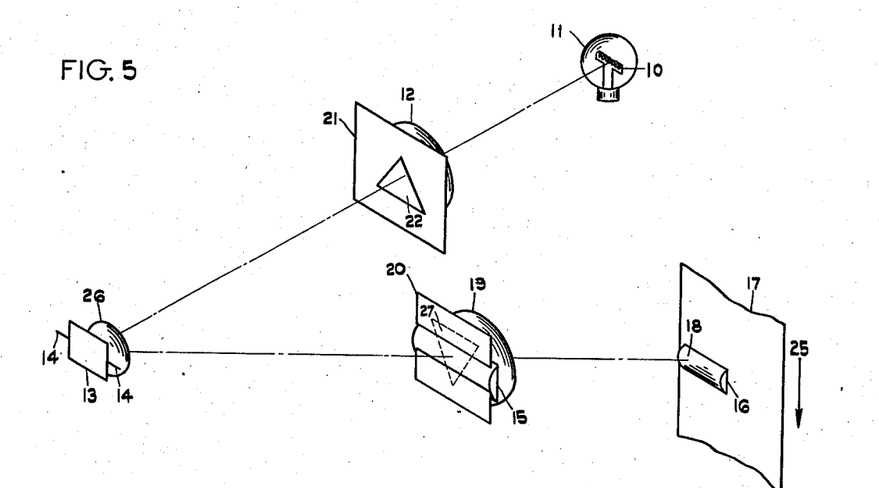
Figure 6:
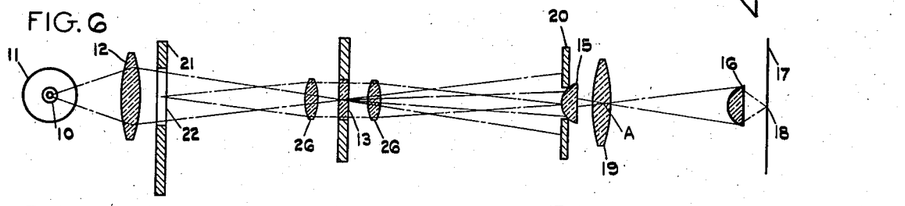
Figure 7:
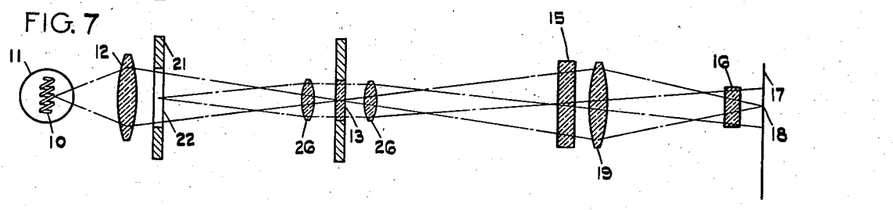

The case shown in Figs. 5 to 7 is identical with the one shown in Figs. 1 to 4 except in so far as cylindrical lens 23 is replaced by a spherical lens 26 which again images opening 22 approximately at cylindrical lens 15. The fact that spherical lens 26 acts in both the vertical and horizontal planes brings it about that the image of the uniformly illuminated opening 22 now is a uniformly illuminated light spot 27 whose horizontal extension gradually varies in a vertical direction (see Fig. 5). In other words, the light flux contained in light spot 27 now is evenly distributed over horizontal levels of light whose lengths, and therefore the light flux contained therein, gradually vary in a manner which is directly and linearly proportional to the manner in which the horizontal extension of opening 22 gradually varies in a vertical direction.

As light spot 27 again is vertically movable by the vibration of mirror 13, what part of the light flux evenly distributed in light spot 27 is acted upon by cylindrical lens 15 depends upon the degrees of deflection of mirror 13 in such a manner that, for varying degrees of deflection, the light flux permitted to enter cylindrical lens 15 emanates from horizontal levels of light of varying lengths. As furthermore position A is close to light spot 27 and cylindrical lens 15 does not act in the horizontal plane, these variations of the light flux acted upon by cylindrical lens 15 now become manifest substantially as variations of the length of the line image formed by cylindrical lens 15 at position A. In the final line image formed at the recording point 18, however, they again become manifest only as variations of its illumination, because its length is again determined by the constant length of the image of mirror 13 formed by the action of spherical lens 19 in the horizontal plane.

Figure 8:
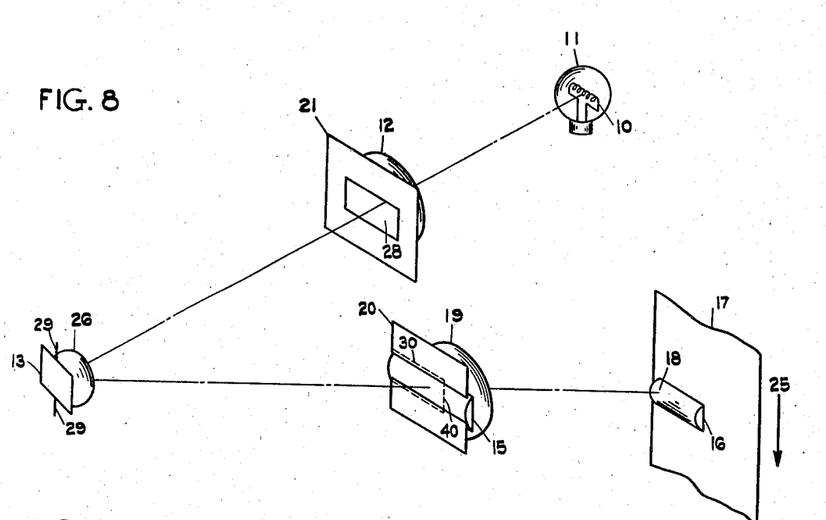
Fig. 8 is a diagrammatic perspective view of another embodiment of the invention.
Figure 9:
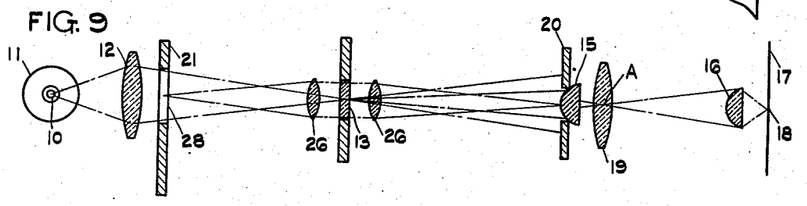
Fig. 9 is a diagrammatic longitudinal section in the vertical plane of the optical system shown in Fig. 8, the optical axis being represented as a straight line and an oscillograph mirror being represented as an aperture.
Figure 10:
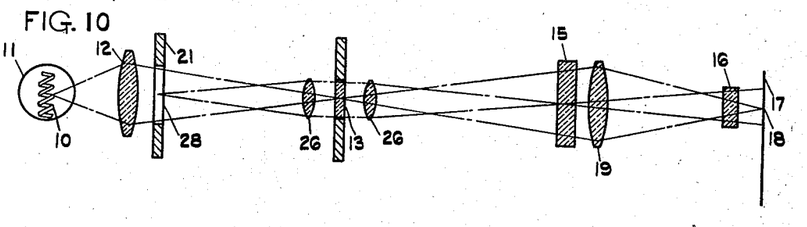
Fig. 10 is a corresponding section in the horizontal plane.

The case shown in Figs. 8 to 10 also employs spherical lens 26 for imaging, by its action in both the vertical and horizontal planes, the uniformly illuminated opening in screen 21 approximately at cylindrical lens 15. But opening 28 in screen 21 now is a rectangle with one of its sides extending vertically, and the axis 29—29 about which mirror 13 is mounted to vibrate now extends vertically. The image of opening 28 is a light spot 30 which again is uniformly illuminated, but which now is horizontally movable by the vibration of mirror 13. Thus, more or less of the evenly distributed light flux in light spot 30 is permitted to enter cylindrical lens 15 in accordance with the electrical impulses to be recorded. For the reason stated in connection with the case shown in Figs. 5 to 7, the variations in light flux of the line image formed by cylindrical lens 15 at position A again become manifest substantially as variations of the length of this line image, while the corresponding variations in light flux of the final line image of constant length again become manifest as variations of only its illumination.

It is understood that the vibration of mirror 13 about the vertical axis 29—29 effects changes of the length of its image as formed by the action of spherical lens 19 in the horizontal plane. But these changes are of such a small order that they do not affect the objects to be achieved by the present invention, and hence it can legitimately be assumed for the purpose of the present specification that the length of the image of mirror 13 formed by spherical lens 19 remains constant also when mirror 13 vibrates about a vertical axis.

The different means employed in the three optical systems shown in Figs. 1 to 4, 5 to 7, and 8 to 10 for varying the amount of light present in the final line image, are alike in that in each case they include an opening which is uniformly illuminated by lamp filament 10, that is, means forming a uniformly illuminated light spot, and means acting in the vertical plane for forming an image of this light spot approximately at cylindrical lens 15, the image of the light spot being movable by the vibration of mirror 13. The action of the last mentioned means in the horizontal plane is immaterial as far as the formation of the final line image is concerned. This action in the horizontal plane therefore is required only in the case shown in Figs. 8 to 10, wherein the light flux contained in the image of the uniformly illuminated light spot must substantially be evenly distributed horizontally because this image is horizontally movable by the vibration of mirror 13.

The fact that in the two cases shown in Figs. 1 to 4 and 5 to 7 there may be employed, for the imagery of opening 22, either cylindrical lens 23 or spherical lens 26 affords an advantageous degree of freedom in designing a particular optical system in accordance with the present invention. The employment of cylindrical lens 23, however, has the specific advantage that reimagery of the structure of lamp filament 10 on film 17 is excluded for any working position of mirror 13, this being the case under the provision and for the reason stated in my application Ser. No. 343,616. The employment of spherical lens 26, in its turn, permits, on account of the formation of a uniformly illuminated light spot on, or in the neighborhood of, mask 20, visible adjustment of the optical system shown in Figs. 5 to 7, and also visible monitoring of the recording of the electrical impulses, in a particularly convenient and accurate manner.

On the other hand, the two cases shown in Figs. 5 to 7 and 8 to 10 both employ spherical lens 26 for the imagery of the uniformly illuminated light spot formed at screen 21. The image of this light spot has to be vibrated in different directions in the two cases, the respective direction depending upon the shape of the light spot. But there is no shape the light spot formed at screen 21 could have which would exclude its image, when formed by spherical lens 26, from being vibrated in some direction with the result of varying the light flux contained in the line image of mirror 13 formed at position A, it being understood that the image of the opening, and the line image of mirror 13 formed by cylindrical lens 15, must be properly dimensioned in order to permit the degree of variation desired. Hence, with an opening of suitable shape the axis of vibration of mirror 13 need neither be horizontal as is axis 14—14, shown in Fig. 1, nor vertical as is axis 29—29, shown in Fig. 8, but may have any inclination with respect to the vertical and horizontal planes of the optical system which it is found desirable to have in a particular case.

The optical systems shown in Figs. 1 to 4, 5 to 7, and 8 to 10 of the present specification are capable of the following modifications which may be applied to each of them unless stated otherwise:

(1) Opening 22 in screen 21 is shown in Figs. 1 and 5 as being an isosceles triangle. However, with mirror 13 vibrating about a horizontal axis, screen 21 may have any other opening whose horizontal extension gradually varies in a vertical direction, such an opening having at least one edge which is inclined with respect to the horizontal plane of the optical system. The opening in screen 21 may, for example, be a right-angled triangle 35 with one of the sides adjacent to the right angle extending horizontally as shown in Fig. 11, or there may be one or more saw-tooth projections extending into it as they do into openings 36 and 37 in Figs. 12 and 13.

Figure 11:
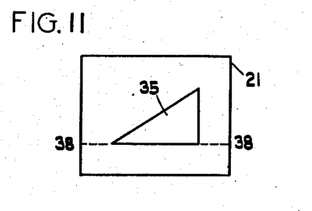
Figs. 11 to 14 show in elevation modification of an element shown in Figs. 1 and 5.
Figure 12:
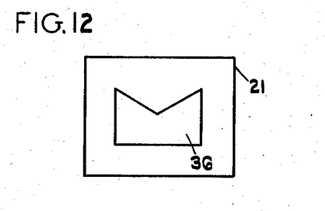
Figure 13:
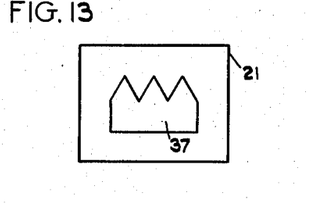

If any of the openings shown in Figs. 11 to 13 is imaged by cylindrical lens 23, there is formed approximately at cylindrical lens 15 a light spot whose illumination gradually varies in a vertical direction, for cylindrical lens 23 does not act in the horizontal plane. The vertical displacement of this light spot of graded illumination by the vibration of mirror 13 produces variations in light flux of the line image of mirror 13 formed at position A, which variations become manifest, as with the employment of opening 22, substantially as variations in illumination of this line image.

If, on the other hand, the images of the openings shown in Figs. 11 to 13 are formed by spherical lens 26 and moved vertically by the vibration of mirror 13, the variations in light flux of the line image formed at position A become manifest substantially as variations of its length. While, however, with opening 22 (Fig. 5) the line image of mirror 13 varies in length at both its ends, it does so at only one end with opening 35 (Fig. 11). With opening 36 (Fig. 12), there are formed two line images in juxtaposition, each varying in length at only one of its ends, and with opening 37 (Fig. 13) a plurality of line images, likewise in juxtaposition but each varying in length at both its ends. But because cylindrical lens 16, which images this line image or images at the recording point 18, does not act in the horizontal plane, there is formed in any of these cases at the recording point 18 a single final line image whose illumination varies when the line image or images formed at position A vary in length.

The gradual variation of the light flux contained in the line image formed at position A is produced by the vibration of mirror 13 in accordance with the electrical impulses to be recorded. The character of this gradual variation, however, depends in each of the two cases shown in Figs. 1 to 4 and 5 to 7, respectively, only upon the gradual variation, in a vertical direction, of the horizontal extension of the opening in screen 21 as produced by the inclined edge or edges thereof. The lower portion of screen 21 may therefore be omitted if desired as indicated by way of example by the broken line 38—38 in Fig. 11.

In order to effect a linear relation between the electrical impulses to be recorded and the transparency of the record used for their reproduction, the horizontal extension of the opening in screen 21 may gradually vary in a non-linear manner. To that end, one or more of its inclined edges may be curved as are the two inclined edges of opening 39, shown in Fig. 14, a method of computing a suitable curve being disclosed, for example, in British specification 424,042 (I. G. Farbenindustrie). Thus, distortions may be canceled which are introduced, for example, by the non-linear characteristics of the oscillograph galvanometer on which mirror 13 is mounted, or of the emulsions of the recording and printing films, or both.

(2) Screen 21 when used in conjunction with a mirror vibrating about a vertical axis need not have a rectangular opening such as opening 28 shown in Fig. 8. It may have any other opening permitting the formation, approximately at cylindrical lens 15, of an image thereof by spherical lens 26, as long as this image has an edge by the horizontal displacement of which the line image formed at position A is varied in length at one of its ends. Such an edge need not be straight as is edge 40, shown in Fig. 8, but may be curved or even ragged if desired.

(3) While cylindrical lens 23 and spherical lens 26, respectively, are shown as being placed in front of mirror 13 so as to act on the light flux proceeding through the optical system both before and after it is reflected from mirror 13, they may also be placed so that they act on only the incident or only the reflected light flux.

Instead of spherical lens 26 there may also be used in the cases shown in Figs. 5 to 7 and 8 to 10, respectively, two cylindrical lenses one of which may act on the incident and the other on the reflected light flux, the opening in screen 21 being imaged approximately at cylindrical lens 15 by one cylindrical lens acting in the vertical and by the other acting in the horizontal plane.

The image of the opening in screen 21 has been described hereinabove as being formed by cylindrical lens 23, and spherical lens 26 or its substitutes, respectively, on, or in the neighborhood of mask 20, that is, approximately at cylindrical lens 15. This expression is not meant to exclude the possibility that this image is formed back of cylindrical lens 15, instead of in front of it as shown, by way of example only, in Figs. 1 to 4, 5 to 7, and 8 to 10.

Figure 15:
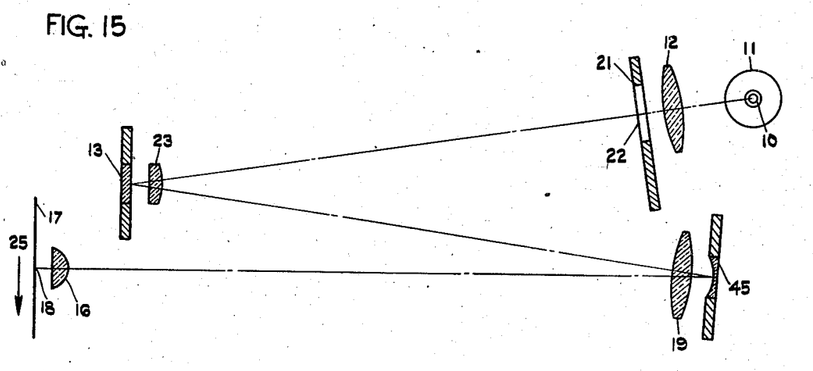
Fig. 15 is a diagrammatic longitudinal section in the vertical plane of the optical system shown in Fig. 1, a cylindrical mirror being substituted for a cylindrical lens and a mask having been omitted.

(4) Cylindrical lens 15 may be replaced by a cylindrical mirror 45, as shown by way of example in Fig. 15 for the case shown in Figs. 1 to 4. From Fig. 15, which is a section in the vertical plane, it will be seen that the employment of cylindrical mirror 45 affords the specific advantage that the optical system may be folded in a convenient manner without the use of additional prisms or like means for altering the direction of a light beam.

Cylindrical mirror 45 is shown as being concave in Fig. 15, and cylindrical lens 15 as being convex throughout the drawings. However, cylindrical lens 15 could also be concave and cylindrical mirror 45 convex, the explanation given hereinabove with respect to the real image of mirror 13 as formed by a convex cylindrical lens or a concave cylindrical mirror being applicable in substance also with respect to the virtual image of mirror 13 as formed by a concave cylindrical lens or a convex cylindrical mirror.

(5) While mask 20 is shown as being placed in front of cylindrical lens 15, it may also have any other position between mirror 13 and film 17 where it intercepts the light flux not acted upon by cylindrical lens 15. In an actual optical system designed according to the present invention, however, this function of mask 20 may be performed by the means holding cylindrical lens 15 in its place in the optical system.

The provision of a part specifically embodying mask 20 is equally superfluous in an actual design when cylindrical mirror 45 is employed in place of cylindrical lens 15. All that need be done in this case is to blacken the parts of the housing structure which surround mirror 45. Mask 20 has therefore been omitted from Fig. 15, which shows the employment of cylindrical mirror 45.

Figure 16:
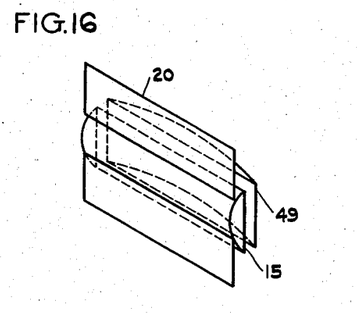
Fig. 16 is a perspective view of a modification of an element common to the optical systems shown in Figs. 1 to 3, 5 to 7, and 8 to 10.
Figure 17:
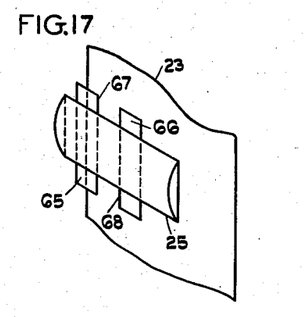
Fig. 17 is a perspective view of another modification of the optical systems shown in Figs. 1 to 3, 5 to 7, and 8 to 10, and Figs. 18a and 18b show adaptations to a particular purpose of an element common to the optical systems shown in Figs. 1 to 3, 5 to 7, and 8 to 10.

(6) It has been pointed out hereinabove that it is immaterial that the action of spherical lens 19 in the vertical plane is barred by mask 20. Hence, there may be used in place of spherical lens 19 a cylindrical lens 49 with its cylinder axis vertical, as shown in Fig. 16, lens 49 having the same focal length and aperture as lens 19 but acting in the horizontal plane only. On the other hand, no harm will result if, in embodiments of the invention other than those shown and described in the present specification, spherical lens 19 should image mirror 13 by acting in the vertical plane also.

Spherical lens 19 has been shown and described hereinabove as being placed between cylindrical lenses 15 and 16 in such a manner that position A falls therewithin. Spherical lens 19 may, however, have any other position between cylindrical lenses 15 and 16 which is consistent with its function to image, by its action in the horizontal plane, mirror 13 approximately at the recording point 18. As long as this condition is fulfilled, spherical lens 19 may also be placed between mirror 13 and cylindrical lens 15, and preferably in the immediate vicinity of lens 15 so as not to interfere, by its action in the vertical plane, with the imagery of the opening in screen 21 by cylindrical lens 23 or spherical lens 26.

When cylindrical lens 49 is employed to image mirror 13 approximately at the recording point 18, it may be placed in any of the positions pointed out in the preceding paragraph for spherical lens 19. As, however, cylindrical lens 49 does not act in the vertical plane, its position when placed between mirror 13 and cylindrical lens 15 is less critical than is that of spherical lens 19.

When the optical systems disclosed in the present specification employ cylindrical mirror 45, spherical lens 19 and cylindrical lens 49, respectively, may be placed in front of mirror 45 in such a manner as to act on the incident as well as the reflected light flux, spherical lens 19 being shown in this position, by way of example, in Fig. 15.

(7) The final line image of constant length and varying illumination which is produced by the cooperation of cylindrical lenses 15 and 16 and spherical lens 19, or cylindrical lenses 15 and 16 and cylindrical lens 49, has been shown and described hereinabove as being formed immediately on film 17. It may, however, also be re-imaged on film 17 by suitable means inserted at a convenient place between cylindrical lens 16 and film 17, which means may act in both the vertical and horizontal planes either with or without changing, in either one plane or in the two planes, the dimensions of the final line image.

(8) It has been assumed hereinbefore that the final line image formed at the recording point 18 is of uniform illumination throughout its entire length. Actually, this is true only in case the image of mirror 13 formed by spherical lens 19 or cylindrical lens 49 is in focus at the recording point 18. If it is out of focus with respect thereto the illumination of the final line image decreases at its ends, and only its central portion is uniformly illuminated. The edges of the impulse record are therefore blurred in this case and should be screened off when prints of the record are made, such screening off now being commonly practised in printing from variable density records.

If, however, it is desired to eliminate the blurred edges when making the original record on film 17, two screens 65 and 66 or like means having vertical edges 67 and 68 may be employed, edges 67 and 68 being spaced apart so as to confine between themselves the uniformly illuminated central portion of the final line image. Screens 65 and 66 may be placed between cylindrical lens 16 and film 17, as shown in Fig. 15, or in front of lamp 11 or mirror 13.

(9) The optical systems disclosed in the present specification are characterized by the fact that, for imaging at the recording point 18 the line image of mirror 13, there is employed in their final stage a lens 16 which acts in the vertical plane only. Lens 16 therefore has to be cylindrical, and the required employment of a cylindrical lens in the final stage of the optical systems has inherent advantages: Such a lens may have a short focal length, which permits of building the optical systems with small physical size, and a cylindrical lens of short focal length is less expensive than a spherical lens system well enough corrected to be capable of forming, over the same length, an equally sharp line image. The optical systems may therefore be built at comparatively little cost.

(10) The method for determining the dimensions of the final line image which is disclosed in the present specification, consists in imaging mirror 13 successively by two means acting in the vertical plane only and also imaging it by means acting in the horizontal plane. This method may be employed not only with the particular means for varying the amount of light present in the final line image which are described hereinabove by way of example, but also with other means for accomplishing the same end provided that they include an oscillograph mirror. Such other means are disclosed, for example, in G. L. Dimmick's U. S. Specifications 2,095,317 and 2,095,318, in which it has been proposed to form a penumbra whose gradation progresses vertically, and which is movable by the vibration of an oscillograph mirror about a horizontal axis. If, for example, such a penumbra is formed in the optical system shown in Figs. 1 to 3 of the present specification, approximately at cylindrical lens 15, the variation of the amount of light present in the final line image resulting from the vibration of the penumbra by mirror 13 is the same as that produced by the vibration of light spot 24 formed in this optical system by the imagery of opening 22 by cylindrical lens 23.

(11) Normally, the optical systems disclosed in the present specification are so adjusted that in the rest or zero position of mirror 13, that is, when no electrical impulses are applied to the oscillograph galvanometer on which it is mounted, the line image of mirror 13 formed at position A contains about half the light flux present therein when it has its maximum length and illumination. If, however, sound is to be recorded by the method generally known as "noiseless recording," mirror 13 may be biased in the manner disclosed in L. T. Robinson's U. S. specification 1,854,159.

Figure 18A:
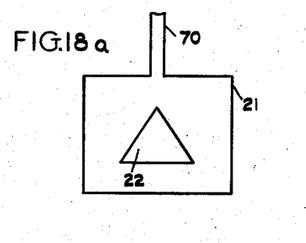
Figure 18B:
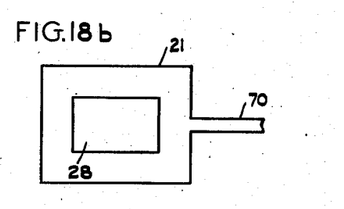

Alternatively, screen 21 may be vibrated vertically when employed with the optical systems shown in Figs. 1 to 4 and 5 to 7, respectively, of the present specification, or horizontally when employed with the optical system shown in Figs. 8 to 10 thereof. To that end, it may be connected by a stem 70, shown by way of example in Figs. 18a and 18b, or like means, to a motor to which an electric current corresponding to the envelope of the sound waves to be recorded is applied. Such a motor and a method for its operation is disclosed, for example, in H. McDowell, Jr.'s, U. S. specification 1,855,197.

Figure 14:
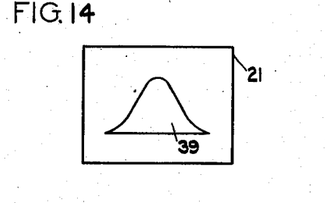

Finally, when screen 21 employed with the optical systems shown in Figs. 1 to 4 and 5 to 7, respectively, of the present specification, has the opening 22 shown in Figs. 1 and 5, the opening 36 shown in Fig. 12, the opening 39 shown in Fig. 14, or a similar opening, noiseless recording may also be achieved by providing adjacent to screen 21 a twin shutter mechanism similar to that disclosed in H. J. Hasbrouck's U. S. specification 2,102,778.

The application of any of the methods for noiseless recording mentioned above will result in shifting the mean density of the sound produced on film 17 in accordance with the envelope of the sound waves to be recorded.

Many other modifications of the invention will readily suggest themselves to those skilled in the art. The invention, therefore, is not to be limited, except in so far as is necessitated by the prior art and by the spirit of the appended claims.

What is claimed is:

1. In an optical system for the photographic recording of electrical impulses which includes a mirror adapted to vibrate in accordance with said electrical impulses, the combination of means acting in the vertical plane only for forming at some position close thereto a line image of said mirror, means acting in the vertical plane only for forming an image of said line image, and means acting in the horizontal plane for imaging said mirror approximately at said image of said line.

2. In an optical system for the photographic recording of electrical impulses which includes a mirror adapted to vibrate in accordance with said electrical impulses, the combination of a cylindrical lens with its cylinder axis horizontal for forming at some position close thereto a line image of said mirror, means acting in the vertical plane only for forming an image of said line image, and means acting in the horizontal plane for imaging said mirror approximately at said image of said line.

3. In an optical system for the photographic recording of electrical impulses which includes a mirror adapted to vibrate in accordance with said electrical impulses, the combination of a cylindrical lens with its cylinder axis horizontal for forming at some position close thereto a line image of said mirror, means acting in the vertical plane only for forming an image of said line image, and a cylindrical lens with its cylinder axis vertical for imaging said mirror approximately at said image of said line.

4. In an optical system for the photographic recording of electrical impulses which includes a mirror adapted to vibrate in accordance with said electrical impulses, the combination of a cylindrical mirror with its cylinder axis horizontal for forming at some position close thereto a line image of said mirror, means acting in the vertical plane only for forming an image of said line image, and means acting in the horizontal plane for imaging said mirror approximately at said image of said line.

5. In an optical system for the photographic recording of electrical impulses which includes a mirror adapted to vibrate in accordance with said electrical impulses, the combination of a cylindrical mirror with its cylinder axis horizontal for forming at some position close thereto a line image of said mirror, means acting in the vertical plane only for forming an image of said line image and a cylindrical lens with its cylinder axis vertical for imaging said mirror approximately at said image of said line.

6. In an optical system for the photographic recording of electrical impulses which includes a mirror adapted to vibrate in accordance with said electrical impulses, the combination of means acting in the vertical plane only for forming at some position close thereto a line image of said mirror, means forming a uniformly illuminated light spot, means acting in the vertical plane for forming an image of said light spot approximately at said first mentioned means, said image of said light spot being movable by the vibration of said mirror, and means acting in the vertical plane only for forming an image of said line image.

7. In an optical system for the photographic recording of electrical impulses which includes a mirror adapted to vibrate in accordance with said electrical impulses, the combination of a cylindrical lens with its cylinder axis horizontal for forming at some position close thereto a line image of said mirror, means forming a uniformly illuimanted light spot, means acting in the vertical plane for forming an image of said light spot approximately at said cylindrical lens, said image of said light spot being movable by the vibration of said mirror, and means acting in the vertical plane only for forming an image of said line image.

8. In an optical system for the photographic recording of electrical impulses which includes a mirror adapted to vibrate in accordance with said electrical impulses, the combination of a cylindrical mirror with its cylinder axis horizontal for forming at some position close thereto a line image of said mirror, means forming a uniformly illuminated light spot, means acting in the vertical plane for forming an image of said light spot approximately at said cylindrical mirror, said image of said light spot being movable by the vibration of said mirror, and means acting in the vertical plane only for forming an image of said line image.

9. In an optical system for the photographic recording of electrical impulses which includes a mirror adapted to vibrate in accordance with said electrical impulses, the combination of means acting in the vertical plane only for forming at some position close thereto a line image of said mirror, means forming a uniformly illuminated light spot, means acting in the vertical plane for forming an image of said light spot approximately at said first mentioned means, said image of said light spot being movable by the vibration of said mirror, means acting in the vertical plane only for forming an image of said line image, and means acting in the horizontal plane for imaging said mirror approximately at said image of said line.

10. In an optical system for the photographic recording of electrical impulses the combination of a light source, a mirror adapted to vibrate in accordance with said electrical impulses, means for directing light from said light source upon said mirror, means acting in the vertical plane only for forming at some position close thereto a line image of said mirror, a screen with an opening, said opening being uniformly illuminated by said light source, means acting in the vertical plane for forming an image of said opening approximately at said second mentioned means, said image of said opening being movable by the vibration of said mirror, and means acting in the vertical plane only for forming an image of said line image.

11. An optical system for the photographic recording of electrical impulses on a film which moves at the recording point in a substantially vertical direction, having, in combination, a light source, a mirror adapted to vibrate in accordance with said electrical impulses, means for directing light from said light source upon said mirror, means acting in the vertical plane only for forming at some position close thereto a line image of said mirror, a screen with an opening, said opening being uniformly illuminated by said light source, means acting in the vertical plane for forming an image of said opening approximately at said second mentioned means, said image of said opening being movable by the vibration of said mirror, means acting in the vertical plane only for forming an image of said line image at said recording point, and means between said mirror and said film for intercepting the light flux not acted upon by said second mentioned means.

12. An optical system for the photographic recording of electrical impulses on a film which moves at the recording point in a substantially vertical direction, having, in combination, a light source, a mirror adapted to vibrate in accordance with said electrical impulses, means for directing light from said light source upon said mirror, means acting in the vertical plane only for forming at some position close thereto a line image of said mirror, a screen with an opening, said opening being uniformly illuminated by said light source, means acting in the vertical plane for forming an image of said opening approximately at said second mentioned means, said image of said opening being movable by the vibration of said mirror, means acting in the vertical plane only for forming an image of said line image at said recording point, means between said mirror and said film for intercepting the light flux not acted upon by said second mentioned means, and means acting in the horizontal plane for imaging said mirror approximately at said recording point.

13. In an optical system for the photographic recording of electrical impulses which includes a mirror adapted to vibrate about a horizontal axis in accordance with said electrical impulses, the combination of means acting in the vertical plane only for forming at some position close thereto a line image of said mirror, means forming a uniformly illuminated light spot the horizontal extension of which gradually varies in a vertical direction, means acting in the vertical plane for forming an image of said light spot approximately at said first mentioned means, said image of said light spot being movable by the vibration of said mirror, and means acting in the vertical plane only for forming an image of said line image.

14. An optical system as defined in claim 13 wherein the horizontal extension of said light spot gradually varies in a vertical direction and in a non-linear manner so as to effect a linear relation between said electrical impulses and the transparency of the record used for the reproduction thereof.

15. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening the horizontal extension of which gradually varies in a vertical direction, said opening being uniformly illuminated by said light source, means acting in the vertical plane for forming an image of said opening approximately at said second mentioned means, said image of said opening being movable by the vibration of said mirror, and means acting in the vertical plane only for forming an image of said line image.

16. An optical system as defined in claim 15 wherein said screen is vertically movable in accordance with the envelope of said electrical impulses.

17. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening which is an isosceles triangle with its base extending horizontally, said opening being uniformly illuminated by said light source, means acting in the vertical plane for forming an image of said opening approximately at said second mentioned means, said image of said opening being movable by the vibration of said mirror, and means acting in the vertical plane only for forming an image of said line image.

18. An optical system as defined in claim 17 wherein one of the two inclined sides of said isosceles triangle is curved so as to effect a linear relation between said electrical impulses and the transparency of the record used for the reproduction thereof.

19. An optical system as defined in claim 17 wherein the two inclined sides of said isosceles triangle are curved so as to effect a linear relation between said electrical impulses and the transparency of the record used for the reproduction thereof.

20. An optical system as defined in claim 17 wherein said screen is vertically movable in accordance with the envelope of said electrical impulses.

21. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening which is a right-angled triangle with one of the sides adjacent to the right angle extending horizontally, said opening being uniformly illuminated by said light source, means acting in the vertical plane for forming an image of said opening approximately at said second mentioned means, said image of said opening being movable by the vibration of said mirror, and means acting in the vertical plane only for forming an image of said line image.

22. An optical system as defined in claim 21 wherein the inclined side of said right-angled triangle is curved so as to effect a linear relation between said electrical impulses and the transparency of the record used for the reproduction thereof.

23. An optical system as defined in claim 21 wherein said screen is vertically movable in accordance with the envelope of said electrical impulses.

24. In an optical system for the photographic recording of electrical impulses which includes a mirror adapted to vibrate about a horizontal axis in accordance with said electrical impulses, the combination of means acting in the vertical plane only for forming at some position close thereto a line image of said mirror, means forming a uniformly illuminated light spot the horizontal extension of which gradually varies in a vertical direction, means acting in the vertical plane only for forming an image of said light spot approximately at said first mentioned means, said image of said light spot being movable by the vibration of said mirror, and means acting in the vertical plane only for forming an image of said line image.

25. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening the horizontal extension of which gradually varies in a vertical direction, said opening being uniformly illuminated by said light source, means acting in the vertical plane only for forming an image of said opening approximately at said second mentioned means, said image of said opening being movable by the vibration of said mirror, and means acting in the vertical plane only for forming an image of said line image.

26. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening which is an isosceles triangle with its base extending horizontally, said opening being uniformly illuminated by said light source, means acting in the vertical plane only for forming an image of said opening approximately at said second mentioned means, said image of said opening being movable by the vibration of said mirror; and means acting in the vertical plane only for forming an image of said line image.

27. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening which is a right-angled triangle with one of the sides adjacent to the right angle extending horizontally, said opening being uniformly illuminated by said light source, means acting in the vertical plane only for forming an image of said opening approximately at said second mentioned means, said image of said opening being movable by the vibration of said mirror, and means acting in the vertical plane only for forming an image of said line image.

28. In an optical system for the photographic recording of electrical impulses which includes a mirror adapted to vibrate about a horizontal axis in accordance with said electrical impulses, the combination of means acting in the vertical plane only for forming at some position close thereto a line image of said mirror, means forming a uniformly illuminated light spot the horizontal extension of which gradually varies in a vertical direction, means acting in both the vertical and horizontal planes for forming an image of said light spot approximately at said first mentioned means, said image of said light spot being movable by the vibration of said mirror, and means acting in the vertical plane only for forming an image of said line image.

29. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening the horizontal extension of which gradually varies in a vertical direction, said opening being uniformly illuminated by said light source, means acting in both the vertical and horizontal planes for forming an image of said opening approximately at said second mentioned means, said image of said opening being movable by the vibration of said mirror, and means acting in the vertical plane only for forming an image of said line image.

30. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening which is an isosceles triangle with its base extending horizontally, said opening being uniformly illuminated by said light source, means acting in both the vertical and horizontal planes for forming an image of said opening approximately at said second mentioned means, said image of said opening being movable by the vibration of said mirror, and means acting in the vertical plane only for forming an image of said line image.

31. In an optical system for the photographic recording of electrical impulses the combination of a light source, a mirror adapted to vibrate about a horizontal axis in accordance with said electrical impulses, means for directing light from said light source upon said mirror, means acting in the vertical plane only for forming at some position close thereto a line image of said mirror, a screen with an opening which is a right-angled triangle with one of the sides adjacent to the right angle extending horizontally, said opening being uniformly illuminated by said light source, means acting in both the vertical and horizontal planes for forming an image of said opening approximately at said second mentioned means, said image of said opening being movable by the vibration of said mirror, and means acting in the vertical plane only for forming an image of said line image.

32. In an optical system for the photographic recording of electrical impulses which includes a mirror adapted to vibrate about a vertical axis in accordance with said electrical impulses, the combination of means acting in the vertical plane only for forming at some position close thereto a line image of said mirror, means forming a uniformly illuminated light spot, means acting in both the vertical and horizontal planes for forming an image of said light spot approximately at said first mentioned means, said image of said light spot being movable by the vibration of said mirror, and means acting in the vertical plane only for forming an image of said line image.

33. In an optical system for the photographic recording of electrical impulses the combination of a light source, a mirror adapted to vibrate about a vertical axis in accordance with said electrical impulses, means for directing light from said light source upon said mirror, means acting in the vertical plane only for forming at some position close thereto a line image of said mirror, a screen with an opening, said opening being uniformly illuminated by said light source, means acting in both the vertical and horizontal planes for forming an image of said opening approximately at said second mentioned means, said image of said opening being movable by the vibration of said mirror, and means acting in the vertical plane only for forming an image of said line image.

34. An optical system as defined in claim 33 wherein said screen is horizontally movable in accordance with the envelope of said electrical impulses.

35. In an optical system for the photographic recording of electrical impulses the combination of a light source, a mirror adapted to vibrate about a vertical axis in accordance with said electrical impulses, means for directing light from said light source upon said mirror, means acting in the vertical plane only for forming at some position close thereto a line image of said mirror, a screen with an opening which is a rectangle with one of its sides extending vertically, said opening being uniformly illuminated by said light source, means acting in both the vertical and horizontal planes for forming an image of said opening approximately at said second mentioned means, said image of said opening being movable by the vibration of said mirror, and means acting in the vertical plane only for forming an image of said line image.

JOHN A. MAURER, Jr.

2,299,024

CERTIFICATE OF CORRECTION.

Patent No. 2,299,024. October 13, 1942.

JOHN A. MAURER, JR.,

It is hereby certified that error appears in the above numbered patent requiring correction as follows: In the drawings, Sheet 2, before the first figure appearing thereon insert --Fig. 15--; page 2, second column, line 2, for the word "proceedings" read --proceeding--; page 3, second column, line 46, for "degrees" read --degree--; page 4, second column, line 8, for "mirrow" read --mirror--; page 6, second column, lines 57 and 68, and page 7, first column, lines 4, 15 and 26, claims 1 to 5 inclusive, after the word "line" and before the period insert --image--; and second column, line 40, claim 11, strike out the comma after "opening"; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.

CERTIFICATE OF CORRECTION.

Patent No. 2,299,024. October 13, 1942.

JOHN A. MAURER, JR.

It is hereby certified that error appears in the printed specification of the above numbered patent requiring correction as follows: Page 7, second column, line 9, claim 9, after the word "line" and before the period insert --image--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.